United States Patent [19]
Ikeda

[11] Patent Number: 5,066,316
[45] Date of Patent: Nov. 19, 1991

[54] EXHAUST GAS PURIFYING APPARATUS

[75] Inventor: Yukio Ikeda, Ryugasaki, Japan

[73] Assignee: Niles Parts Co., Ltd., Tokyo, Japan

[21] Appl. No.: 551,242

[22] Filed: Jul. 11, 1990

[30] Foreign Application Priority Data

Oct. 6, 1989 [JP] Japan .................. 1-117596[U]
Oct. 6, 1989 [JP] Japan .................. 1-117597[U]
Oct. 6, 1989 [JP] Japan .................. 1-117598[U]

[51] Int. Cl.$^5$ .............................. B03C 3/00
[52] U.S. Cl. .......................... 55/122; 55/123; 55/146; 55/152
[58] Field of Search ............... 55/122, 123, 146, 152

[56] References Cited

U.S. PATENT DOCUMENTS

| | | | |
|---|---|---|---|
| 512,265 | 1/1894 | Andrioli | 55/152 |
| 1,381,719 | 6/1921 | McGee et al. | 55/152 |
| 1,828,631 | 10/1931 | Whitney | 55/122 |
| 1,828,646 | 10/1931 | Dantsizen | 55/122 |
| 1,957,808 | 5/1934 | Rosecrans | 55/152 |
| 2,195,431 | 4/1940 | Shively et al. | 55/152 |
| 2,989,144 | 6/1961 | Styrie | 55/151 |
| 3,526,081 | 9/1970 | Kusters | 55/127 |
| 3,620,008 | 11/1971 | Newbold | 60/30 |
| 3,979,193 | 9/1976 | Sikich | 55/123 |
| 4,010,011 | 3/1977 | Reif | 55/127 |
| 4,587,807 | 5/1986 | Suzuki | 60/274 |
| 4,908,047 | 3/1990 | Leonard | 55/122 |

FOREIGN PATENT DOCUMENTS 299476 10/1916 Fed. Rep. of Germany ........ 55/150
0970787 1/1951 France .
57-20510 2/1982 Japan .

Primary Examiner—Bernard Nozick
Attorney, Agent, or Firm—Ronald P. Kananen

[57] ABSTRACT

The present invention presents an exhaust gas purifying apparatus characterized by a first electrode composed of an electric conductor in which its surface is formed as a projected formation, a second electrode composed of an electric conductor and disposed opposite to the first electrode, an electric insulator attached to at least one surface of the second electrode, opposite to the first electrode, a streamer corona generating portion composed of a high voltage electric power source connected to the first and second electrodes, means for injecting an adhesive oil into the surface of the electric insulator at the first electrode side, means for circulating the adhesive oil, a set member for removably supporting the streamer corona generating portion within a path duct of the exhaust gas, and further a contact member for contacting the second electrode when the streamer corona generating portion is mounted within a path duct of the exhaust gas. Furthermore, the present invention relates to an exhaust gas purifying apparatus for purifying the exhaust gas of automobiles by a corona discharge, and particularly to an exhaust gas purifying apparatus including a streamer corona generating portion capable of generating a streamer corona discharge with stability for a long period.

16 Claims, 2 Drawing Sheets

FIG. 2
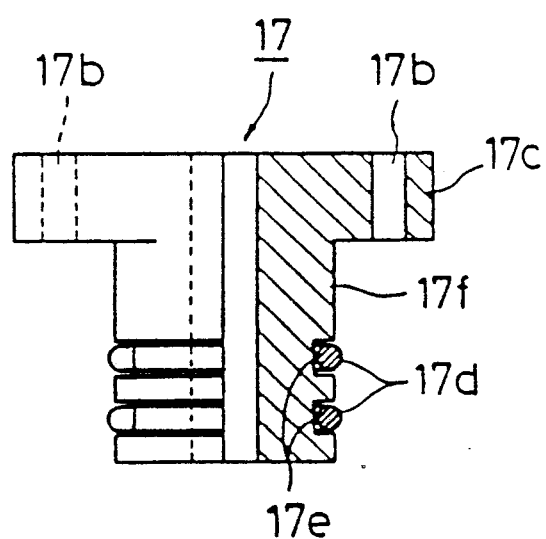
FIG. 3
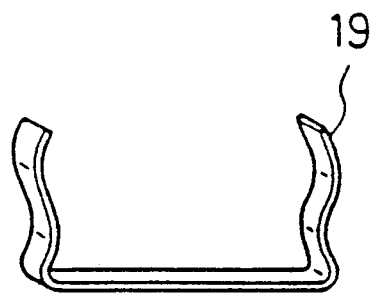
FIG. 4     FIG. 5     FIG. 6
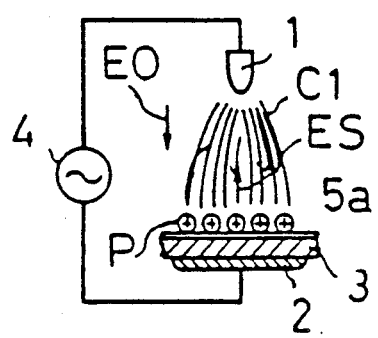 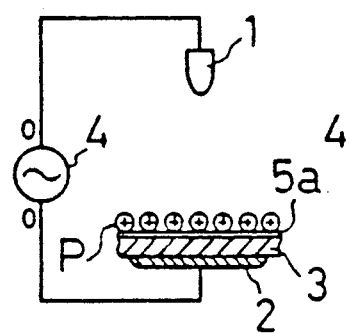 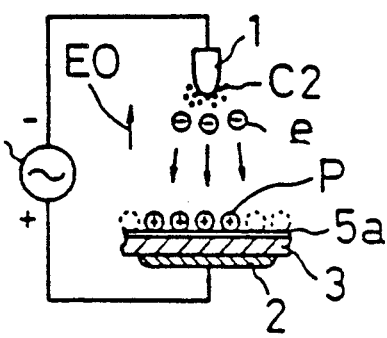

EXHAUST GAS PURIFYING APPARATUS

BACKGROUND OF THE INVENTION

The present invention relates to an exhaust gas purifying apparatus for purifying the exhaust gas of automobiles by utilizing a corona discharge. More particularly, this invention relates to an exhaust gas purifying apparatus having a streamer corona generating portion capable of generating a stable streamer corona discharge for a long period.

Hitherto, there has been known Japanese Patent Laid-Open Publication No. 57-20510 as a technique of this type. According to the conventional technique, a known exhaust gas purifying apparatus is composed of a cylindrical-type dust collector, and a desired number of discharge wires mounted within the hollow portion of the cylindrical-type dust collector, the discharge wires being supplied with a high voltage, thereby eliminating micro-particles such as tar particles and graphite from an exhaust gas. Specifically, the micro-particles floating in the exhaust gas are attracted to the wall of the dust collector by utilizing the function of a strong electrostatic field generated between the cylindrical-type dust collector and the discharge wires, thereby eliminating the dust.

According to the conventional technique, however, there has been a possibility of danger in that the discharge wires are sometimes disconnected when a spark discharge is generated between the dust collector and the discharge wires. Furthermore, the attracting force required for eliminating an injurious gas such as NOx and COx from the exhaust gas, is weak and insufficient.

Apparatuses utilizing a corona discharge phenomenon have recently been considered as effective devices for activating and eliminating such injurious gas. However, an effective apparatus for maintaining a desirable value for the attracting force with respect to the dust in the exhaust gas by means of a general corona discharge phenomenon has not been achieved.

To this end, it was necessary in order to realize the technique for eliminating the injurious gas by using the corona discharge to generate a particular corona that is a streamer corona and to insure the increment of the streamer corona.

Furthermore, it was necessary in order to generate a stable streamer corona for a long period to eliminate the influence affecting the generation of the streamer corona due to an attachment of carbonaceous particles or the like.

SUMMARY OF THE INVENTION

The present invention is made in view of the aforementioned problems, and presents an exhaust gas purifying apparatus characterized by a first electrode composed of an electric conductor in which its surface is formed as a projected formation, a second electrode composed of an electric conductor and disposed opposite to the first electrode, an electric insulator attached to at least one surface of the second electrode, opposite to the first electrode, a streamer corona generating portion composed of a high voltage electric power source connected to the first and second electrodes, means for injecting an adhesive oil into the surface of the electric insulator at the first electrode side, and means for circulating the adhesive oil. The exhaust gas purifying apparatus is further characterized in that there is provided a set member for removably supporting the streamer corona generating portion within a path duct of the exhaust gas. The exhaust gas purifying apparatus is still further characterized in that there is provided a contact member contacting the second electrode when the streamer corona generating portion is mounted within a path duct of the exhaust gas, and further the object of the present invention is to generate a stable streamer corona and further to purify the exhaust gas by using the streamer corona for a long period.

The feature of the present invention resides in an exhaust gas purifying apparatus comprising means for injecting an adhesive oil into the surface of an insulating portion at a first electrode side of a streamer corona generating portion, and means for circulating the above-mentioned adhesive oil. Therefore, there are achieved the advantages that a streamer corona discharge with a large scale can be maintained with stability for a long period, and an injurious gas such as NOx in the exhaust gas of automobiles can be purified with stability for a long period by passing such gas into the above-mentioned corona generating portion.

Furthermore, another feature of the present invention resides in a set member for removably supporting the above-mentioned streamer corona generating portion in a path duct for the exhaust gas. Furthermore, still another feature of the present invention resides in a contact member to be contacted with the second electrode, when the streamer corona generating portion is mounted into the path duct for the exhaust gas.

Therefore, there are achieved the advantages that the irregularity produced by the objects attached on the surface of the insulating portion at the first electrode side can be smoothed by the adhesive oil film for a long period; as a result a streamer corona discharge with a large scale can be maintained with stability for a long period, and an injurious gas such as NOx in an exhaust gas of automobiles can be purified with stability for a long period by passing such gas into the above-mentioned corona generating portion; and further the streamer corona generating portion can be easily removed and remounted upon maintenance of the streamer corona generating portion.

BRIEF DESCRIPTION OF THE DRAWINGS

FIG. 2 is a side view showing a set member, a portion of which is broken away;

FIG. 3 is a perspective view of one embodiment of the connector member shown in FIG. 1;

FIG. 4 is a view showing the corona generating condition for a plus polarity;

FIG. 5 is a view showing the zero point condition; and

FIG. 6 is a view showing the corona generating condition for a minus polarity.

DETAILED DESCRIPTION OF THE PREFERRED EMBODIMENT

Figure 1:
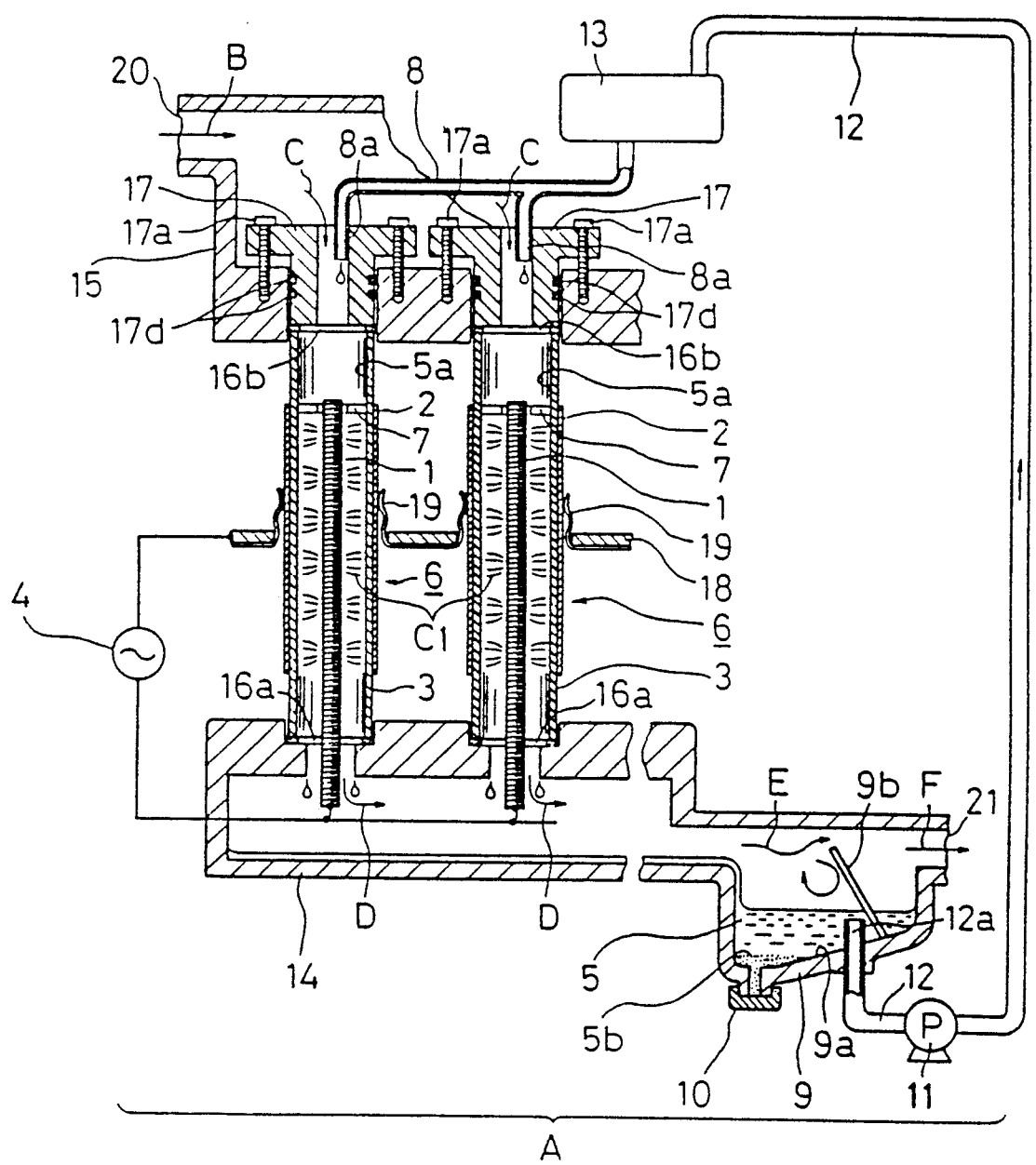
FIG. 1 is a vertical sectional view of a preferred embodiment of the present invention.

FIGS. 1 to 3 are views for showing a preferable embodiment of the present invention.

In this embodiment, there is explained an example constructed for the purpose of purifying the injurious gas included in an exhaust gas of automobiles.

FIG. 1 is a vertical view showing the entire construction of the exhaust gas purifying apparatus A mounted within an exhaust gas tube, according to the present invention.

As can be seen from FIG. 1, a streamer corona generating portion 6 for generating a streamer corona C1 by being applied with a high voltage from a high voltage electric power source 4 is composed of a first electrode 1, a second electrode 2, an insulating portion 3, the high voltage electric power source 4, and a supporting portion 7.

In detail, the above-mentioned first electrode 1 is, for example, a stainless steel rod with screw threads. The work of making the screw threads may be achieved by using a cutting machine such as a milling machine or a molding machine such as an inserting machine. By changing the pitch of the screw thread, the sectional formation of the surface of the first electrode 1 may be formed as a projection with a triangular formation or with a trapezoidal formation. The first electrode 1 is supported at the central portion of the cylindrical insulating portion 3 made of such as ceramic material, by using the supporting portion 7 made of an insulating material.

Furthermore, the second electrode 2 is mounted on the outer periphery of the insulating portion 3. The second electrode 2 may be made by printing a metallic paste on the surface of the insulating portion 3 made of such as a ceramic material, and then burning it. Alternatively, the second electrode 2 may be made of a metallic pipe and further the insulating portion 3 may be made on the inner surface of the second electrode 2 with a porcelain enamel method using an organic glass or the like. Furthermore, the mere combination of an insulating pipe and a metallic pipe is allowable.

The first electrode 1 and the second electrode 2 are electrically connected to the high voltage power source 4, respectively. The high voltage electric power source 4 is a circuit for generating a high voltage with plus and minus polarities in a certain frequency, and its waveform may be a sine wave, a pulse wave, or the like.

The above-mentioned frequency is a constant frequency or the frequency is in synchronism with the revolution speed of the engine depending on the output of such as an ignition coil.

An oil injecting pipe 8 comprises means for injecting an adhesive oil 5 on the surface of the insulating portion 3 at the first electrode side. The oil injecting pipe 8 has a drop opening 8a for dropping the adhesive oil 5 which has a predetermined adhesive property, such as an engine oil, from the upper end portion of the insulating portion 3. The adhesive oil 5 dropped from the drop opening 8a is affected with Coulomb forces by which the adhesive oil 5 is diffused on the surface of the insulating portion 3 facing the first electrode 1 when the adhesive oil reaches the electric field formed by the first and second electrodes 1 and 2.

Furthermore, a receiving portion 9 for the adhesive oil 5 is provided with a cap 10 having screw threads for exhausting precipitates 5b in the adhesive oil which accumulate at the bottom of the receiving portion 9. A circulating pipe 12 in the receiving portion 9 is connected to a pump 11 used as means for circulating the adhesive oil 5. The circulating pipe 12 is the pipe for connecting the receiving portion 9 to a tank 13 through the pump 11. An end portion 12a of the circulating pipe to be connected to the receiving portion 9 is positioned higher than the bottom 9a of the receiving portion 9, thereby avoiding any suction of the precipitates 5b.

A collision plate 9b is provided in the receiving portion 9 for separating the mist such as the adhesive oil 5 included in the exhaust gas. The receiving portion 9 is connected to a lower duct 14 as a path of the exhaust gas, and the above-mentioned streamer corona generating portion 6 is supported in a sandwich fashion by the lower duct 14 and an upper duct 15 mounted on an opposite side of the lower duct 14.

In detail, the lower portion of the streamer corona generating portion 6 is pressed against the lower duct 14 through a packing 16a made of silicon rubber, and similarly the upper duct is pressed against a set member 17 through a packing 16b. The set member 17 is fixed to the upper duct 15 by using screws 17a. The set member 17 is made of metallic material and has a configuration such as shown in FIG. 2. The set member 1 makes it easy to remove the streamer corona generating portion 6 and remount it upon maintenance thereof. Furthermore, the set member 17 is composed of end portions 17c having holes 17b to be screwed with the screws 17a and a pressing portion 17f having grooves 17e to be fitted with O-rings 17d. Furthermore, there is provided a ground plate 18, between the lower duct 14 and the upper duct 15, into which a plurality of the streamer corona generating portions 6 are inserted. The ground plate 18 is the member for grounding the second electrode 2 of each of the streamer corona generating portions 6 together with the one end of the high voltage electric power source 4. The ground plate 18 is electrically connected to the second electrode 2 through a contact member 19. The above-mentioned contact member 19 is made of metallic material such as Beryllium—Copper alloy, and has a U-shaped configuration as shown in FIG. 3. The contact member 19 makes it easy to remove the streamer corona generating portion 6 and remount it, upon maintenance of the streamer corona generating portion 6.

There is provided a humidity removing device, though not shown in FIG. 1, at the front stage of the upper duct 15 thereby preventing any generation of dew in the streamer corona generating portion 6. Furthermore, the upper duct 15 is connected to an engine (not shown) and the lower duct 14 is connected to an exhaust hole (not shown).

The operation of the streamer corona generating portion composed of the above-mentioned members will be explained with reference to FIG. 1. The exhaust gas fed from such as an engine (not shown) of an automobile through an entrance 20 into the upper duct 15 as shown by arrow B, passes into a plurality of the streamer corona generating portions 6 as shown by arrows C. At that time, many streamer coronas are produced by a discharge phenomenon within the streamer corona generating portions 6, and therefore the above-mentioned exhaust gas passes entirely through the above-mentioned streamer coronas.

The exhaust gas includes impurities of injurious gas such as nitrogen oxide (NOx), and the ionized injurious gas can be eliminated from the exhaust gas due to the discharge operation in the above-mentioned streamer corona generating portions 6. Furthermore, the exhaust gas passed through the streamer corona generating portion 6 reaches the lower duct 14 as shown by arrow D, and exhausts from an exhaust opening 21 located at a rear stage through the receiving portion 9 as shown by arrows E and F.

On the other hand, the adhesive oil 5 is injected into the streamer corona generating portions 6 through the oil injecting pipe 8 from the tank 13 and the drop openings 8a. The above-mentioned adhesive oil 5 dropped into the streamer corona generating portions 6 receives the Coulomb forces, whereby the oil is diffused and attracted to the surface of the insulating portion 3 in the region between both electrodes in which the streamer coronas C1 are generated.

As a result, the surface of the insulating portion 3 is always smoothed because of the above-mentioned adhesive oil 5. Then, the adhesive oil 5 flowing out from the streamer corona generating portions 6 reaches the receiving portion 9 through the lower duct 14.

At that time, a part of the adhesive oil 5 is included in the exhaust gas as a mist, and the mist hits the collision plate 9b, thereby losing its speed so that it is collected in the receiving portion 9. By this, the adhesive oil 5 can be used effectively. Then, the adhesive oil 5 accumulated in the receiving portion 9 is picked up by the pump 11, which moves the adhesive oil 5 toward the tank 13, thereby injecting it again into the streamer corona generating portion 6.

The exhaust gas purifying apparatus of the present invention thus constructed is operated as follows.

At first, when a high voltage is applied between a first electrode and a second electrode, a streamer corona is generated between an electric insulating portion attached on the inner surface of the second electrode and the first electrode, in a streamer corona generating portion.

Such conditions are shown in FIGS. 4 to 6, and will be explained hereinafter.

FIG. 4 shows the condition in which the first electrode 1 and the second electrode 2 are applied with a plus voltage and a minus voltage from a high voltage source 4 respectively.

The arrow EO in FIG. 4 shows the direction of electric fields generated by the high voltage applied between the first electrode 1 and the second electrode 2. The arrow ES shows the direction of reverse electric fields generated by the electric field charged on the surface of an electrically insulating portion 3 covered with adhesive oil 5a, the reference letter P shows the plus electric charge charged on the surface of the insulating portion 3, and the reference letter C1 shows a positive polarity corona, particularly a streamer corona which is the positive polarity corona which is most significantly developed with this embodiment.

In the condition as shown in FIG. 4, the streamer corona C1 is generated and simultaneously the plus electric charge P is charged on the surface of the insulating portion 3. The reverse electric field ES is developed in accordance with the amount of the plus electric charge P and the streamer corona C1 being restricted. Then, the streamer corona C1 is attenuated and changed to a brush corona or a film-like corona which is generated in the vicinity of the first electrode 1 as time lapses.

The phenomenon of the attenuation and change of the streamer corona C1 is produced in that the amount of the charged pulse electric charge P is greatly increased. Therefore, it is possible to increase the streamer corona C1 by providing any means for decreasing the greatly increased plus electric charge P.

According to the present invention, the greatly increased plus electric charge P is neutralized and decreased by the steps as shown in FIGS. 5 and 6 mentioned hereinafter, thereby maintaining the generation of the streamer corona C1.

FIG. 5 shows the condition of a so-called zero point, at which the polarity of the output of the high voltage electric power source 4 is switched. At the condition shown in FIG. 5, the generation of the corona C1 is once stopped.

FIG. 6 shows a reverse polarity condition with respect to that shown in FIG. 4, and shows a condition in which the first electrode 1 and the second electrode 2 are applied with a minus voltage and a plus voltage, respectively. In FIG. 6, the reference letter e shows a plurality of electrons and the reference C2 shows a minus polarity corona. In the condition shown in FIG. 6, the minus polarity corona C2 and the electrons e are produced, and the electrons e are coupled with the plus electric charge P accumulated on the surface of the insulating portion 3, thereby effecting the neutralization. By this, the excessive plus electric charge P is decreased, and the streamer corona C1 is again generated when the condition has again progressed to that of FIG. 4.

As mentioned above, the streamer corona C1 is continuously generated in the streamer corona generating portion by repeating the conditions as shown in FIGS. 4 to 6, and the above-mentioned streamer corona C1 is dissipated and transferred to a spark discharge when carbonaceous particles are attached to the surface of the insulating portion 3, thereby producing irregularity on the surface of the insulating portion 3. However, according to the present invention, the surface of the insulating portion 3 is always covered with a film of the adhesive oil 5a by injecting the adhesive oil 5 circulated by the circulating means by using an oil injecting pipe into the above-mentioned streamer corona generating portion. Therefore, the streamer corona generating portion 6 produces a stable streamer corona C1 for a long period. Furthermore, if the exhaust gas is introduced into the streamer corona generating portion 6, the ionized injurious gas within the exhaust gas is attracted to the inner wall of the streamer corona generating portion, thereby purifying the exhaust gas.

While a preferred embodiment of the present invention has been shown and described herein, it will be apparent to those skilled in the art that numerous changes and modifications may be made without departing from the spirit and scope of the present invention which should be determined by the appended claims.

I claim:

1. An exhaust gas purifying apparatus comprising:
an enclosure portion including an entrance for introducing exhaust gas into said enclosure portion and an exhaust opening for exiting purified exhaust gas from said enclosure portion;
at least one first electrode composed of an electric conductor having a surface defining a projecting formation;
at least one second electrode composed of an electric conductor having a surface lying opposite said first electrode;
an electric insulator attached to said surface of said second electrode, opposite to said first electrode;
a streamer corona generating portion composed of a high voltage electric power source connected to said first and second electrodes for generating bridged stream coronas stably within a space defined by said first electrode and said electric insulator over an extended period of time to remove fine particles and harmful gases from said exhaust gas passing through said bridged stream coronas;

means for injecting an adhesive oil onto said surface of said electric insulator so that said adhesive oil is diffused and attracted to said surface to form a viscous oil film thereon; and means for circulating said adhesive oil through said enclosure portion.

2. The exhaust gas purifying apparatus according to claim 1, wherein said means for injecting said adhesive oil is adapted to include an oil injecting pipe having at least one opening therein for dropping the adhesive oil.

3. The exhaust gas purifying apparatus according to claim 1, further comprising a set member for removably supporting said streamer corona generating portion in the path of the exhaust gas.

4. The exhaust gas purifying apparatus according to claim 3, further comprising a contact member contacting said second electrode when said streamer corona generating portion is mounted in the path of said exhaust gas.

5. The exhaust gas purifying apparatus according to claim 1, wherein said means for circulating said adhesive oil is adapted to include a receiving portion for receiving and accumulating said adhesive oil diffused and attracted to said surface of said electric insulator.

6. The exhaust gas purifying apparatus according to claim 5, wherein said receiving portion includes an opening and a cap for exhausting precipitates in the adhesive oil which accumulate in said receiving portion.

7. The exhaust gas purifying apparatus according to claim 5, wherein said means for circulating said adhesive oil is further adapted to include a circulating pipe for connecting the receiving portion to a tank through a pump, said circulating pipe including an end portion connected to and extending into said receiving portion to avoid suction of precipitates within said adhesive oil.

8. The exhaust gas purifying apparatus according to claim 7, wherein said receiving portion includes a collision plate for separating mist included in said exhaust gas.

9. The exhaust gas purifying apparatus according to claim 1, wherein said enclosure portion includes an upper portion and a lower portion, said lower portion including a lower duct and said upper portion including a upper duct pressed against a set member through a packing member to facilitate removal of said streamer corona generating portion and remount of said streamer corona generating portion upon maintenance thereof.

10. The exhaust gas purifying apparatus according to claim 9, further comprising a ground plate electrically connected to said second electrode through a contact member between said upper duct and said lower duct for grounding the second electrode of the streamer corona generating portion with said high voltage electric power source.

11. An exhaust gas purifying apparatus for purifying the exhaust of, for example, automobiles, comprising:
an enclosure portion including an entrance for introducing exhaust gas into said enclosure portion and an exhaust opening for exiting purified exhaust gas from said enclosure portion;
at least one first electrode centrally disposed in said enclosure portion and composed of an electric conductor having a surface defining a projecting formation;
at least one second electrode composed of an electric conductor having a surface lying opposite said first electrode;
an electric insulator attached to said surface of said second electrode, opposite to said first electrode;
means for injecting an adhesive oil onto said surface of said electric insulator so that said adhesive oil is diffused and attracted to said surface to form a viscous oil film thereon;
means for circulating said adhesive oil through said enclosure portion;
a streamer corona generating portion composed of a high voltage electric power source connected to said first and second electrodes for generating bridged stream coronas stably within a space defined by said first electrode and said electric insulator over an extended period of time to remove fine particles and harmful gases from said exhaust gas passing through said bridged stream coronas to form participates which are attracted and deposited onto said inner surface of said insulator means, removed from said inner surface of said insulator means by said adhesive oil film and removed from said inner surface of said insulator means by said adhesive oil film; and
said means for circulating said adhesive oil including a tank, a pump, a receiving portion for receiving and accumulating said adhesive oil and said participates and a circulating pipe for connecting said receiving portion to said tank through said pump, said circulating pipe having an end portion connected to and extending into said receiving portion to avoid suction of said precipitates within said adhesive oil and to circulate said adhesive oil through said enclosure.

12. The exhaust gas purifying apparatus according to claim 11, wherein said receiving portion includes a collision plate for separating mist included in said exhaust gas.

13. The exhaust gas purifying apparatus according to claim 11, wherein said receiving portion includes an opening and a cap for exhausting precipitates in the adhesive oil which accumulate in said receiving portion.

14. An exhaust gas purifying apparatus for purifying the exhaust of, for example, automobiles, comprising:
an enclosure including an upper portion and a lower portion, said upper portion including an upper duct pressed against a set member and an entrance for introducing exhaust gas into said enclosure, said lower portion including a lower duct and an exhaust opening for exiting purified exhaust gas from said enclosure;
at least one first electrode centrally disposed in said enclosure and composed of an electric conductor having a surface defining a projecting formation;
at least one second electrode composed of an electric conductor having a surface lying opposite said first electrode and extending at least partially between said upper portion and said lower portion of said enclosure;
an electric insulator attached to said surface of said second electrode, opposite to said first electrode;
means for injecting an adhesive oil onto said surface of said electric insulator so that said adhesive oil is diffused and attracted to said surface to form a viscous oil film thereon;

means for circulating said adhesive oil through said enclosure; and said streamer corona generating portion composed of a high voltage electric power source connected to said first and second electrodes for generating bridged stream coronas stably within a space defined by said first electrode and said electric insulator over an extended period of time to remove fine particles and harmful gases from said exhaust gas passing through said bridged stream coronas to form participates which are attracted and deposited onto said inner surface of said insulator means, whereby said participates are removed from said inner surface of said insulator means by said adhesive oil film.

15. The exhaust gas purifying apparatus according to claim 14, wherein said set member includes at least one end portion having at least one opening therein to be attached to said upper duct and said set member including a pressing portion having grooves to be fitted with O-rings, whereby said set member facilitates removal of said streamer corona generating portion from said enclosure.

16. The exhaust gas purifying apparatus according to claim 14, further comprising a ground plate electrically connected to said second electrode through a contact member between said upper duct and said lower duct for grounding the second electrode of the streamer corona generating portion with said high voltage electric power source.

* * * * *